Sept. 27, 1949.   H. O. BERRY   2,483,257
SAW SETTING MACHINE
Filed April 28, 1947   2 Sheets-Sheet 1
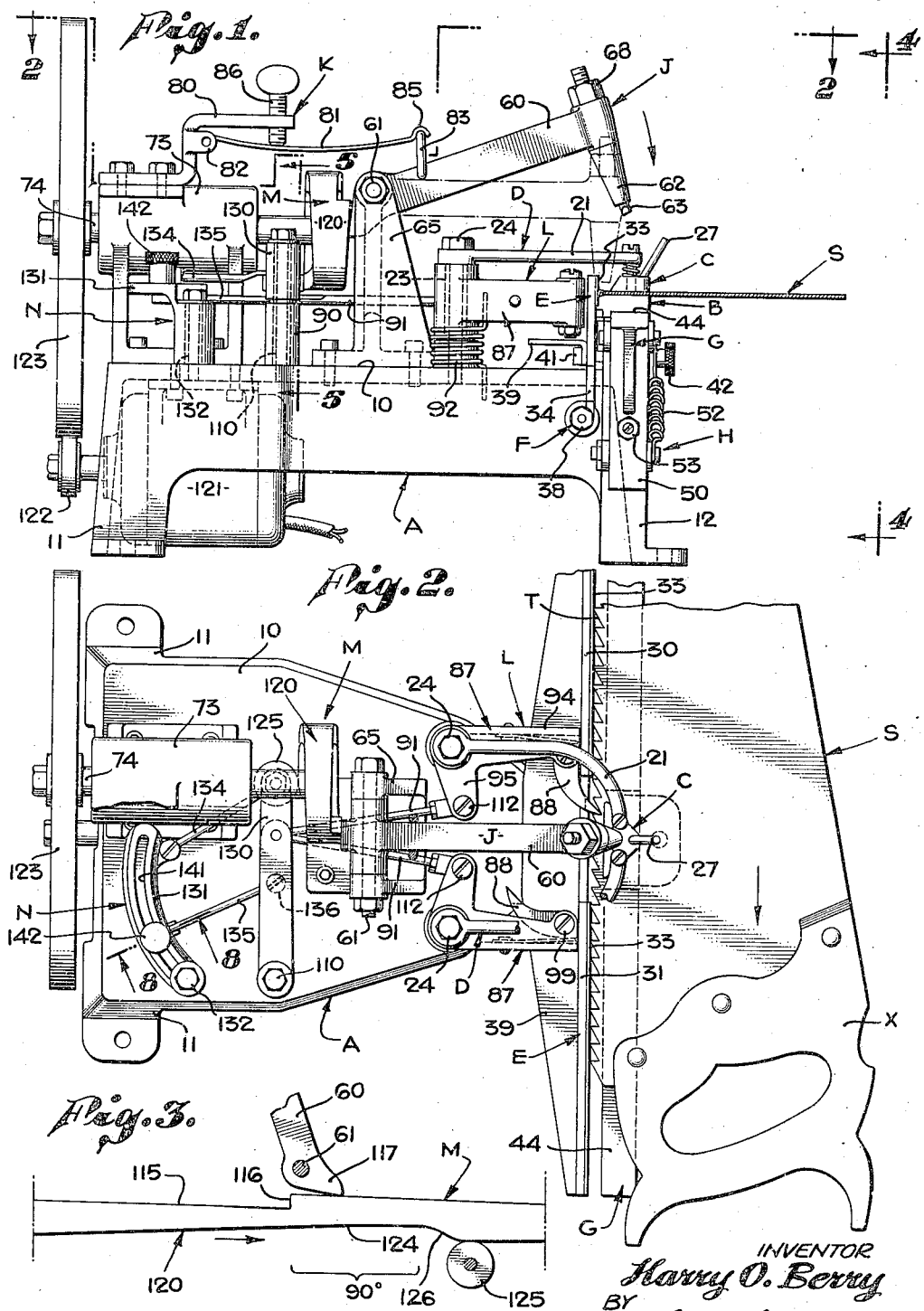
INVENTOR
Harry O. Berry
BY
ATTORNEY Sept. 27, 1949. H. O. BERRY 2,483,257
SAW SETTING MACHINE
Filed April 28, 1947 2 Sheets-Sheet 2
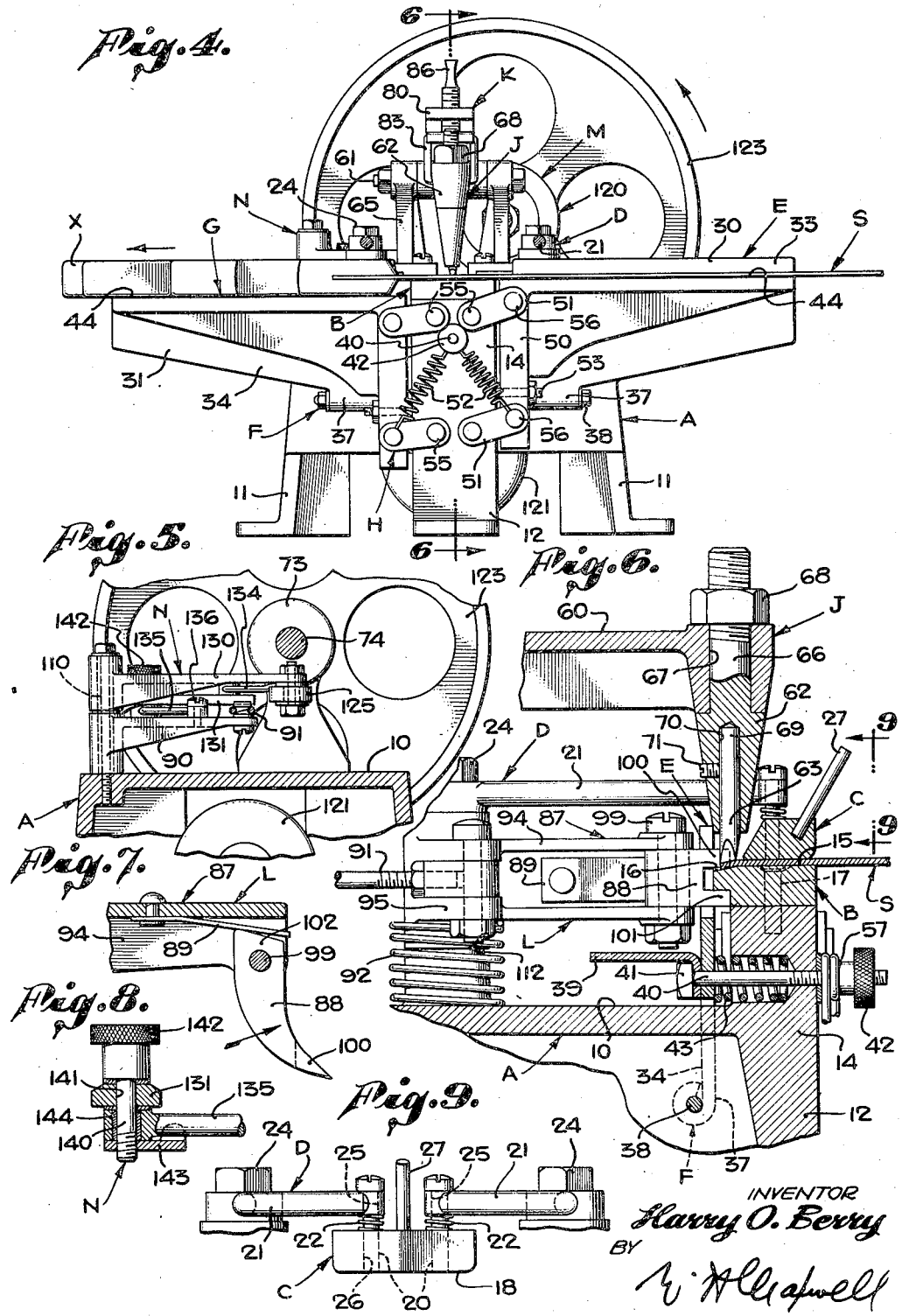

Patented Sept. 27, 1949

2,483,257

UNITED STATES PATENT OFFICE 2,483,257

SAW SETTING MACHINE

Harry O. Berry, Inglewood, Calif.

Application April 28, 1947, Serial No. 744,467

13 Claims. (Cl. 76—62)

This invention relates to a saw setting machine and it is a general object of the invention to provide a simple, accurate and dependable power driven machine operable to set the teeth of a saw.

It is a general object of my present invention to provide a saw setting machine that will act to effectively, accurately, and rapidly set the teeth of a saw and which includes mechanism by which the mechanism can be quickly and accurately adjusted to properly accommodate the teeth being set. In the machine that I have provided I may easily, quickly, and accurately adjust the depth to which the tooth is set, that is, the extent of tooth set or turned by the machine, and I may also adjust or vary the amount that the saw is fed each time the setting striker operates, in order to accommodate the spacing of teeth ordinarily encountered.

Another object of my invention is to provide a machine of the general character referred to involving a simple, effective saw rest or support which supplements the anvil over which the saw operates and which is such as to accommodate a saw handle or like obstruction such as may occur close to the toothed edge of the saw, in a manner to interfere with the ordinary fixed rest.

Another object of the invention is to provide a saw setting machine of the general character referred to wherein there are two distinct elements operated from a single cam, one of these elements being the saw feed and the other the tooth striker.

It is a further object of the present invention to provide an adjustable drive between the operating cam and the feeding means by which the action of the feeding means can be accurately adjusted without variation of the cam action.

A further object of the present invention is to provide a simple, effective, dependable operating spring in connection with the tooth striker. In accordance with my invention I provide a leaf spring with adjusting means whereby I am able to gain a sharp, effective blow which can be adjusted to best suit the teeth being set.

A further object of the present invention is to provide a saw setting mechanism of the general character referred to involving a simple, practical and compact general arrangement of parts. By my invention I provide a mechanism that is simple and inexpensive of both operation and manufacture. The mechanism in the present invention involves but few simple, inexpensive parts and the various parts are arranged and related to form a compact, practical machine.

The various objects and features of my invention will be fully understood from the following detailed description of a typical preferred form and application of the invention, throughout which description reference is made to the accompanying drawings, in which:

Fig. 1 is an end elevation of the machine provided by the present invention, showing a sectional view of a saw plate in place in the machine and showing the striker elevated about ready for operation. Fig. 2 is a plan view of the machine showing a typical hand saw in position therein and with the feed means engaged to feed the saw in the direction indicated by the arrow, being a view taken substantially as indicated by line 2—2 on Fig. 1. Fig. 3 is a diagrammatic view of the cam that I have provided being a view showing the formation and relationship of the two cam faces provided on the single cam member. Fig. 4 is a front elevation of the machine, being a view taken as indicated by line 4—4 on Fig. 1. Fig. 5 is a detailed transverse sectional view taken as indicated by line 5—5 on Fig. 1. Fig. 6 is an enlarged detailed sectional view of a portion of the machine taken as indicated by line 6—6 on Fig. 4. Fig. 7 is an enlarged view taken at the outer end portion of one of the feed rockers showing the ratchet finger carried thereby. Fig. 8 is an enlarged detailed sectional view taken as indicated by line 8—8 on Fig. 2, and Fig. 9 is an enlarged view of the pressure shoe and a portion of its support, being a view taken as indicated by line 9—9 on Fig. 6.

The machine of the present invention involves, generally, a frame A, an anvil B carried by the frame to support the toothed edge portion of a saw S, a pressure shoe C engaging the saw and cooperating with the anvil to hold the saw in position thereon, mounting means D for the shoe C, a saw stop E, mounting means F for the stop E, horizontal rests G for the saw, mounting means H for the rests, a striker J, spring means K driving the striker, feed means L for advancing the saw relative to the anvil, a single drive means M for retracting or lifting the striker, and operating the feed means, and an adjustable driving connection N between the means M and the feed means L.

The frame A serves as a base or carrier for the various other parts of the machine and in practice it may vary widely in form and construction. In the preferred form of the invention illustrated in the drawings the frame involves a horizontally disposed plate or top 10 supported on legs 11 and 12. In the particular case illustrated there are two spaced legs 11 at what I will term the rear of the machine and a single leg 12 at the front of the machine. The frame preferably includes a vertically disposed head portion 14 at the front of the machine which head projects upwardly from the base 10 and also somewhat below the base 10. The front leg 12 depends from and may be considered an extension of the head 14.

The anvil B is mounted at the front or forward portion of the machine, preferably on the upper end of the head 14, and it has a flat top face 15 supporting the saw S. In the preferred form of the invention the top 15 of the anvil is horizontally disposed as shown throughout the drawings. The anvil is characterized by a straight beveled edge 16 over which the teeth are formed or struck, and in the preferred arrangement the edge 16 extends sidewise of the machine and is at the inner or rear edge portion of the anvil. In practice I prefer to form the anvil as a separate part of unit in which case it can be readily formed and finished so that it is a dependable wear resisting part. In the drawings I have shown the anvil secured on the head 14 by suitable fastening devices or screws 17.

The pressure shoe C is above and opposed to the anvil B and bears on the toothed edge portion of the saw clear of the teeth T. The pressure shoe may be a suitably shaped body or block of material such as is shown in Fig. 9, having a flat smooth bottom 18 engaging the upper side of the saw S. It is to be noted that the shoe C terminates short of the beveled edge 16 of the anvil so that it does not contact the teeth of the saw which occur above the beveled edge 16 of the anvil.

The means D mounting the shoe C serves to guide the shoe for vertical movement and includes means whereby the shoe is normally yieldingly urged toward the anvil in order to clamp the saw to the anvil. In the preferred form of the invention as shown in the drawings the means D includes spaced vertical guide posts 20 carried by mounting arms 21 and helical compression springs 22 carried by the posts and located between the arms and the shoe to normally urge the shoe downwardly. The arms form fixed or rigid supports for the guide posts 20 and may be supported on or from the top 10 of the frame in any suitable manner. In the case illustrated the arms are fixed on the upper ends of pivot posts 23 which project upwardly from the top, as clearly shown in Figs. 1 and 2 of the drawings. Screw retainers 24 hold the arms on the upper end portions of the pivot posts.

In practice I prefer to support the shoe C from the arms 21 so that they may be adjusted relative to the anvil. In the drawings I have shown the guide posts 20 in the form of screws slidably engaged through openings 25 in the arms 21 and threaded into openings 26 in the shoe. The springs 22 are helical compression springs surrounding the posts 20 and held under compression between the arms 21 and the shoe. It will be apparent that through the mounting post described the shoe C is subject to being lifted vertically as through a suitable handle 27, and it will be apparent that the springs 22 normally yieldingly urge the shoe downwardly and when the shoe is properly adjusted it serves to retain the saw in proper position on the top 15 of the anvil.

The saw stop E is related to the anvil B to form a stop against which the toothed edge of the saw is positioned. The stop E is an elongate element disposed parallel with the beveled edge 16 of the anvil and it projects upwardly just rearward of the anvil so that the toothed edge of the saw engages it when the saw is moved or advanced rearwardly. In the preferred form of the invention stop E is divided into two separate sections 30 and 31 located at opposite sides of the anvil so that the saw is guided at both sides of the anvil. Each stop section may include an elongate strip of suitable material such as hardened steel having a smooth front face 33 along which the teeth of the saw slide as the machine operates.

The mounting means F for the stop means E includes, generally, a vertically disposed mounting arm 34 the top of which presents spaced horizontal portions to which the stops 30 and 31 are attached while the bottom is pivotally secured to the frame A. The mounting arm may be bifurcated to have spaced downwardly extending portions 37 that occur at opposite sides of the frame to be held by suitable co-axial pivot members 38. In the case illustrated the arm 34 is in the form of a plate, and since it is of considerable width it is desirable that it be reinforced as by a stiffening rib 39.

In accordance with my invention the arm 34 carrying the stop plates 30 and 31 is adjustable to vary its position relative to the beveled edge of the anvil. In the preferred form of the invention the adjustment of the arm 34 is effected through an adjusting screw 40 that has a head 41 at the inner side of the arm 34 while its shank extends through the head 14 of the frame and projects from the front of the head to carry a nut 42. A helical compression spring 43 is carried in a rearwardly opening socket in the head 14 and acts between the bottom of the socket and the arm 34 to normally yieldingly urge the arm rearwardly. The rearwardly movement of the arm is stopped by the head 41 and the position of the head is determined by adjustment of the nut 42 on the shank of the adjusting screw. It is to be observed that the nut 42 is located at the front of the head 14 at a point where it is readily accessible for convenient operation.

The horizontal rests G continue or project from opposite ends of the anvil, that is, they are horizontally disposed members extending sidewise at the forward portion of the machine forward of the stops E and beyond the ends of the anvil. Each rest presents a smooth flat top face 44 on which the saw rests and is free to slide. The means H by which the rests are supported carries the rests for vertical movement and normally yieldingly supports the rests with their top faces 44 horizontal and in the plane of the top 15 of the anvil B. The rests are such that they may be depressed in order to accommodate projections on the blade of the saw such as the handle X of the saw in the event that such part occurs at a point on the saw that might otherwise interfere with the rests.

The mounting construction illustrated involves a vertical leg 50 depending from the inner end of each rest, upper and lower pairs of links 51 connecting the leg to the head of the frame, springs 52 acting to normally yieldingly lift the legs, and stop screws 53 limiting upward movement of the mechanism so that the tops 44 of the rests are flush with the top 15 of the anvil. The upper and lower pairs of links are equal in length and are coupled to the head 14 by pivot pins 55 and to the legs of the rests by pivot pins 56. The links are of equal length and the pivot pins so located that the legs are maintained in vertical position as they move vertically between positions such as are shown in Fig. 4 of the drawings where, at the left, one rest is shown depressed by the handle of the saw while at the right the rest is flush with the anvil. The springs 52 are light springs fixed to the head at 51 and having their lower ends coupled to the legs where the lower links are connected to the legs. The springs 52 are helical tension springs extended when the rests are depressed as shown in Fig. 4.

Through the linkage arrangement above described the legs 50 move inward or toward the head 14 as they move upward. The rests are stopped in the desired position by screws 53 carried by the legs 50 with projecting ends that stop against the sides of the head 14.

The striker J cooperates with the anvil setting the teeth T of the saw S and it involves, generally, a striker arm 60, a horizontal pivot pin 61 carrying the arm, a head 62 on the outer or forward end of the arm and depending therefrom, and a striker tip 63 carried by the head. The pivot pin 61 which carries the striker arm 60 has a fixed pivotal axis somewhat above the plane of the anvil top and rearward of the anvil. The striker arm 60 extends forward from the pivot pin to a point above the anvil and the head 62 on the arm carries the striker tip so that it cooperates with the beveled edge 16 of the anvil to deflect or set a saw tooth when the arm 60 moves downward causing the tip 63 to strike the saw tooth that is positioned in its path. The pivot pin 61 is shown supported on a suitable upright of the bracket 65 projecting upwardly from the top 10 of the base.

The head 62 is preferably detachable from the arm 60. For instance, as shown in the drawings, it has a shank 66 carried in an opening 67 provided in the end of the arm. A nut 68 is threaded on the shank clamping the head to the arm. The striker tip is preferably a suitably dressed tool with a shank 69 carried in a socket 70 entering the head 62 from its lower end. The shank 69 is shown retained in the socket 70 by a set screw 71.

The means K provided for driving the striker is preferably a spring means that engages and drives the striker arm 60. In the preferred form of the invention the means K is characterized by an adjustable leaf spring and in the preferred arrangement the means K is carried by or mounted on the main bearing 73 that carries the drive shaft 74 of means M. In the arrangement that I have provided the drive shaft 74 extends forward from the rear of the machine and the bearing 73 that supports the shaft is located at the rear end portion of the machine where it projects somewhat above the top 10 of the frame.

The means K involves, generally, a sectional bracket fixed to the top of the bearing 73 and having a forwardly extending horizontal arm 80. The spring of means K is a leaf spring 81 having its rear end carrier by a pivot pin 82 held by the bracket which carries the arm 80. The spring 81 extends forward from the pivot pin 82 beneath the arm 80 and its forward or projecting end is coupled to the striker arm 60 by a suitable link 83. The link is pivotally carried by the arm and seats in a downwardly faced holder 85 on the end of the spring. An adjusting screw 86 is threaded to the outer end of the arm 80 and projects downwardly therefrom to bear on the top of the spring 81 the parts being proportioned and related so that the screw bears on the spring between the pivot pin 82 and the link 83. By varying the position of the screw 86 the action of the spring on the striker arm 60 can be varied so that the striker delivers any suitable blow.

The feed means L acts to feed or advance the saw S horizontally over the anvil B with its teeth in engagement with a stop E. The feed means L is such as to feed the saw in either direction, that is, either to the left or to the right. In accordance with the preferred form of the invention the means L involves two like rockers 87 mounted on the vertical pivots 23 beneath the arms 21 of means D. Ratchet fingers 88 are carried by the outer ends of the rockers and are operated by springs 89. The two rockers are operatively connected to a single operating arm 90 by links 91 and spring 92 normally yieldingly urge the rockers outwardly or away from each other.

The rockers 87 are like, oppositely disposed bell cranks having long arms 94 carrying the fingers 88 and short arms 95 to which the links 91 connect. The long arms 94 extend forwardly beneath the fixed arms 21 of means D to points immediately behind the stops 30 and 31. The fingers 88 are mounted on the projecting or forward ends of the arms 94 by pivot pins 99, the fingers being mounted at the inner or opposed sides of the two arms 94. Each finger 88 has a bifurcated tip with a suitably shaped and sharpened upper portion 100 located to engage teeth of the saw when the finger is in operating position, and a lower portion 101 engaged upon the inner edged portion of the anvil to have guiding engagement therewith. The inner or pivoted end portion of each finger has a cam part 102 engaged by the spring 89.

When the finger 88 is swung to a forward or operating position such as is shown in Fig. 7, the projecting part of the cam portion 102 is engaged by the spring so the finger is urged forward as indicated by the arrow in Fig. 7. When the finger is swung back or in the direction opposite to that indicated by the arrow in Fig. 7, the high portion of the cam moves past center so the spring normally yieldingly holds the finger back, as shown at the lower part of Fig. 2 of the drawings. In practice it is a very simple matter for the operator to throw one finger forward and the other back as the fingers are desired for use and it will be apparent that the direction of feed of the saw is governed by the finger that is engaged or in the operating position.

The operating lever 90 of the means L is mounted on a vertically disposed pivot post 110 so that it has a fixed pivotal axis. The links 91 are pivotally connected to the outer end of the lever 90 and they diverge somewhat as they extend forward from the lever 90 to connect to the ends of the short arms 95 through pivot pins 112. The parts are arranged and proportioned so that as the operating arm 90 is oscillated the rockers 97 are oscillated equally and by suitable oscillation of the arm 90 the desired movement is imparted to the engaged feed finger to cause the desired feed of the saw.

The drive or operating means M that I have provided is an important feature of the present invention since it is a cam means involving but a single cam which drives both the feed means L and the striker J. The means M in its preferred form involves the drive shaft 74 carried in the main bearing 73 and projecting forward from the rear portion of the machine so that it has a projecting forward end which carries the cam 120. In practice the shaft may be driven in any suitable manner, as for instance from a motor 121 located beneath the top 10 of the frame. In the drawings I have shown the motor shaft carrying a drive pulley 122 having frictional engagement with a wheel 123 on the rear end of shaft 74.

The cam 120 is a simple disc-type cam having a front or forward side or face shaped to drive the striker and having a back or rear face shaped to drive the feed means. The two faces of the cam may be shaped and proportioned to gain any desired movement or action. However, the mechanism that I have provided is such that the front face of the cam may involve a simple, helically formed or pitched face 115 the ends of which are joined by a shoulder 116. A cam follower 117 preferably in the form of a projection on the striker arm 60 engages and normally cooperates with the cam face 115, the action being such that as the cam face rotates the follower 117 is gradually moved or lifted, causing the arm 60 to be lifted until the follower passes off of the shoulder 116, whereupon it drops to the low portion of the cam face allowing the striker arm 60 to be suddenly moved downward under the action of the means K.

The back or rear cam face 124 may be similar to the front cam face, that is, it may be a helical face extending around the cam with its ends joined by an abrupt or partially inclined connecting part 126. In the preferred form of the invention a follower in the form of a roller 125 cooperates with the rear cam face to be gradually lifted or positioned as the cam rotates and to then quickly drop as it cooperates with the connecting part 126. The follower 125 may be considered a part of the driving connection N between the means M and the feed means L.

The driving connection involves, generally a follower arm 130 carried on the pivot post 110 and carrying the follower roller 125. A transmission arm 131 is carried on a pivot 132 and is operatively connected with the follower arm 130 by a link 134. An adjustment link 135 connects transmission arm 131 and the operating arm 90 of the feed means L. The adjustment link 135 has one end carried by a fixed pivot pin 136 carried by one of the arms and is adjustably pivotally connected to the other arm. In the case illustrated the pivot pin 136 is carried by arm 90 of means L at a fixed point remote from the pivotal mounting 110 of arm 90. The link 135 is adjustably pivotally connected to the transmission arm 131 by a pivot pin 140 operating in a slot 141 extending longitudinally in arm 131.

The pin 140 has an operating head 142 and is threaded into a clamp plate 143 which retains the link 135 on the pin. The plate 143 clamps against the arm 131 through a sleeve 144 carried on the pin 140 and rotatably supporting the link 135. Through this construction the head 142 can be rotated to loosen the connection so that the pin 140 can be slid to any desired position in the slot 141 and the head can be rotated to clamp the pin 140 in the desired adjusted position longitudinally of the arm 131. At all times the link 135 is pivotally carried by the pin 140 through the bushing or sleeve 144. It will be apparent that as the pin 140 is shifted longitudinally in the slot 141 that extends lengthwise of arm 131 the extent to which the arm 90 of means L is oscillated may be varied, giving the feed means the desired action.

In operating the machine the saw S is arranged on the anvil B with its teeth T in engagement with the stop E and with the first tooth to be set aligned with the striker J. The means N is set according to the spacing of the teeth on the saw so that the saw is advanced or fed in the desired manner each time the striker is operated, and one finger 88 of the means L is engaged so that the saw is fed in the desired direction as the machine operates. As the machine operates, that is, as the motor 121 drives the shaft 74, the cam 120 revolves, with the result that the striker is alternately lifted and then released so that it is operated through the action of means K, and the feed means L is operated in synchronism with the striker, the cam faces 115 and 124 being related as shown in Fig. 3 so that the finger of the feed means advances slowly to feed the saw as the arm of the striker lifts the feeding motion of the finger being completed and the finger allowed to retract rapidly under the influence of springs 92, prior to the striker being released to operate under the influence of means K.

It will be apparent from the foregoing description that the rests accommodate themselves to the structure of the saw as shown in Fig. 4 and it will be apparent how the stops E may be adjusted so the teeth of the saw are properly positioned relative to the anvil and striker while the connecting means N may be adjusted so that the saw is fed or advanced in the desired manner in synchronism with operation of the striker. When the saw has been advanced or fed through the machine in one direction it is a simple matter for the operator to reverse the relationship of the feed fingers 88 and turn the saw end for end so that it is fed through the machine in the opposite direction. It is to be understood that during operation of the saw the shoe C holds the saw in position in the machine with the blade of the saw in firm contact with the top 15 of the anvil.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A saw setting machine including, a frame, an anvil fixed on the forward portion of the frame, a striker carried by the frame cooperating with the anvil to set teeth of a saw located on the anvil, a stop pivotally carried by the frame to be engaged by the toothed edge of the saw, the stop having saw engaging portions projecting laterally from opposite sides of the frame, depending portions pivoted to the frame and a central web between the first mentioned portions, a screw means operable to adjust the stop relative to the anvil including a screw carried by the frame and engaged with said web of the stop and an operating member threaded on the screw and located at the front of the frame.

2. A saw setting machine handling a saw having a thin flat blade and a projecting handle on the blade including, a frame, an anvil on the frame having a flat top, a striker carried by the frame cooperating with the anvil to set teeth of a saw resting on the top of the anvil, a rest for the saw, a mounting carrying the rest for vertical movement between an up position where its top is flush with the top of the anvil and a depressed position where it engages under the handle of the saw, and means normally yieldingly urging the rest up to the first mentioned position.

3. A saw setting machine including, a frame, an anvil on the frame and having a flat top, a striker carried by the frame cooperating with the anvil to set teeth of a saw resting on the top of the anvil, saw rests at opposite sides of the anvil, and means yieldingly supporting the rests from the frame with their tops flush with the top of the anvil.

4. A saw setting machine including, a frame, an anvil on the frame and having a flat top, a striker carried by the frame cooperating with the anvil to set teeth of a saw resting on the top of the anvil, saw rests at opposite sides of the anvil, and means yieldingly supporting the rests from the frame with their tops flush with the top of the anvil including two pairs of like parallel links supporting each rest from the frame and springs normally yieldingly holding the rests elevated.

5. A saw setting machine including, a frame, an anvil on the frame and having a flat top, a striker carried by the frame cooperating with the anvil to set teeth of a saw resting on the top of the anvil, a pressure shoe above the anvil yieldingly holding the saw on the anvil, saw rests at opposite sides of the anvil, and means yieldingly supporting the rests from the frame with their tops flush with the top of the anvil.

6. A saw setting machine including, a frame, an anvil fixed on the frame, a striker carried by the frame cooperating with the anvil to set teeth of a saw located on the anvil, saw rests at opposite sides of the anvil, means yieldingly supporting the rests from the frame with their tops flush with the top of the anvil, a stop carried by the frame to be engaged by the toothed edge of the saw, and means operable to adjust the stop relative to the anvil.

7. A saw setting machine including, a frame, an anvil fixed on the frame, a striker carried by the frame cooperating with the anvil to set teeth of a saw located on the anvil, a pressure shoe above the anvil yieldingly holding the saw on the anvil, saw rests at opposite sides of the anvil, means yieldingly supporting the rests from the frame with their tops flush with the top of the anvil, a stop carried by the frame to be engaged by the toothed edge of the saw, and means operable to adjust the stop relative to the anvil.

8. A saw setting machine including, a frame, an anvil on the frame, a striker pivoted to the frame and cooperating with the anvil to set teeth of a saw resting on the anvil, spring means operating the striker toward the anvil, feed means advancing the saw relative to the anvil including pivoted bell cranks carrying pivoted tooth engaging pawls, a single cam retracting the striker, and an operating connection between the cam and feed means including a pivoted lever oscillated by the cam, a pivoted arm carrying a rod slidably pivotally connected to the lever, and links connecting the arm and bell cranks.

9. A saw setting machine including, a frame, a horizontally disposed anvil on the frame, a striker pivoted to the frame to move vertically and cooperating with the anvil to strike down on teeth of a saw resting horizontally on the anvil, spring means operating the striker toward the anvil, feed means advancing the saw relative to the anvil, and a single cam means retracting the striker and operating the feed means, the spring means including an elongate leaf spring supported at one end and having its other end bearing down on the striker, and a screw accessible at the top of the machine and bearing down on the spring intermediate its ends pressuring the spring so it exerts pressure on the striker.

10. A saw setting machine including, a frame, a horizontally disposed anvil on the frame, a yieldingly supported saw rest adjacent the anvil normally flush with the anvil and depressible to accommodate a saw handle, an adjustable saw stop adjacent the anvil, a striker pivotally carried by the frame cooperating with the anvil to strike down on teeth of a saw on the anvil, a spring operating the striker toward the anvil, an adjusting member bearing down on the spring and accessible at the top of the machine, feed means for advancing the saw relative to the striker and anvil, and a single cam retracting the striker and operating the feed means.

11. A saw setting machine including, a frame, a horizontally disposed anvil on the frame, yieldingly supported saw rests projecting laterally from the anvil at each side thereof, the rests being independently depressible from the plane of the anvil, an adjustable saw stop adjacent the anvil, a striker pivotally carried by the frame projecting forward from the rear of the machine cooperating with the anvil to strike down on teeth of a saw on the anvil, a leaf spring fixed to the frame and overlying the striker to operate the striker down toward the anvil, an adjustment screw above and engaging the spring to apply pressure thereto, feed means advancing the saw relative to the striker and anvil, a cam unit having a face operating to retract the striker and a face operating the feed, and an adjustable driving connection between the last mentioned cam face and feed means.

12. A saw setting machine including, a frame, a horizontally disposed anvil on the frame, a yieldingly supported saw rest adjacent the anvil and movable vertically relative thereto, an adjustable saw stop adjacent the anvil, a striker pivotally carried by the frame cooperating with the anvil to strike down on teeth of a saw on the anvil, a spring overlying the striker and operating the striker downward toward the anvil, feed means for advancing the saw relative to the striker and anvil, including opposed pivoted rockers, fingers carried by the rockers engageable with teeth of the saw, a pivoted operating arm, and links connecting the operating arm and rockers, a rotating cam retracting the striker, and an operating connection between the cam and operating arm including a pivoted adjustment arm, a follower engaging the cam and operating the adjustment arm, and a link pivoted to the operating arm and slidably pivoted to the adjustment arm.

13. A saw setting machine including, a frame, a horizontally disposed anvil on the frame, saw rests at opposite sides of the anvil and projecting laterally therefrom, means yieldingly supporting each saw rest for vertical movement relative to the anvil, an adjustable saw stop adjacent the anvil, a striker pivotally carried by the frame to overlie the anvil and cooperating with the anvil to strike downward on teeth of a saw on the anvil, a spring overlying the striker and operating the striker toward the anvil, feed means advancing the saw relative to the striker and anvil, including opposed pivoted rockers in the form of bell cranks, fingers carried by arms of the rockers engageable with teeth of the saw, a pivoted operating arm, and links connecting the operating arm and the other arms of the rockers, a rotating cam having opposite cam faces one operating the striker to retract it, and an operating connection between the other face of the cam and feed means including, a pivoted follower arm carrying a cam follower engaging the said other face of the cam, a pivoted adjustment arm, a link connecting the follower arm and the adjustment arm, and a link pivoted to the operating arm and slidably pivotally connected to the adjustment arm.

HARRY O. BERRY.

REFERENCES CITED

The following references are of record in the file of this patent:

UNITED STATES PATENTS

| Number | Name | Date |
|---|---|---|
| 24,408 | Shoemaker | June 14, 1859 |
| 47,806 | Disston | May 23, 1865 |
| 198,077 | Bugbee | Dec. 11, 1877 |
| 216,063 | Smith | June 3, 1879 |
| 326,305 | Long | Sept. 15, 1885 |
| 396,823 | Logan | Jan. 29, 1889 |
| 483,497 | Little | Sept. 27, 1892 |
| 533,611 | Rupsch | Feb. 5, 1895 |
| 680,484 | Gottsmann | Aug. 13, 1901 |
| 720,172 | Mossholder | Feb. 10, 1903 |
| 767,130 | Addison | Aug. 9, 1904 |
| 930,178 | Hedstrom | Aug. 3, 1909 |
| 1,038,186 | Niemi | Sept. 10, 1912 |
| 1,565,675 | Root | Dec. 15, 1925 |
| 1,763,760 | Collier | June 17, 1930 |
| 1,794,695 | Juhl | Mar. 3, 1931 |
| 1,859,363 | Hart | May 24, 1932 |
| 1,970,864 | Nosan | Aug. 21, 1934 |